US007423992B2

(12) United States Patent
Iwamura (10) Patent No.: US 7,423,992 B2
(45) Date of Patent: Sep. 9, 2008

(54) TIME SLOT AND CARRIER FREQUENCY ALLOCATION IN A NETWORK

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 995 days.

(21) Appl. No.: 10/616,344

(22) Filed: Jul. 9, 2003

(65) Prior Publication Data

US 2004/0208139 A1    Oct. 21, 2004

Related U.S. Application Data

(60) Provisional application No. 60/463,457, filed on Apr. 16, 2003.

(51) Int. Cl.
*H04Q 7/00* (2006.01)
(52) U.S. Cl. .................... 370/330; 370/342; 370/347
(58) Field of Classification Search ............... 370/310; 375/336
See application file for complete search history.

(56) References Cited

U.S. PATENT DOCUMENTS

| | | | |
|---|---|---|---|
| 5,090,024 A | 2/1992 | Vander Mey et al. | |
| 5,574,748 A | 11/1996 | Vander Mey et al. | |
| 5,777,544 A | 7/1998 | Vander Mey et al. | |
| 6,064,662 A * | 5/2000 | Gitlin et al. | 370/330 |
| 6,101,214 A | 8/2000 | Hershey et al. | |
| 6,288,632 B1 | 9/2001 | Hoctor et al. | |
| 6,289,000 B1 | 9/2001 | Yonge, III | |
| 6,356,555 B1 * | 3/2002 | Rakib et al. | 370/441 |
| 6,442,129 B1 * | 8/2002 | Yonge et al. | 370/204 |
| 6,826,160 B1 * | 11/2004 | Wang et al. | 370/329 |
| 7,212,564 B2 * | 5/2007 | Parizhsky et al. | 375/144 |
| 2002/0181434 A1 | 12/2002 | Kruys | |
| 2003/0039317 A1 * | 2/2003 | Taylor et al. | 375/295 |
| 2004/0184427 A1 * | 9/2004 | Lynch et al. | 370/342 |

OTHER PUBLICATIONS

"PowerPocket (TM) Primer", Rev. 2, White Paper by Intellon Corp., 2001.
"A Comparative Performance Study of Wireless and Power Line Networks", Lin, et al., IEEE Communications Magazine, Apr. 2003.
"Modeling and Evaluation of the Indoor Power Line Transmission Medium", Cañete, et al., IEEE Communications Magazine, Apr. 2003.
International Search Report and Written Opinion of the International Searching Authority, PCT/US04/10227, Jan. 6, 2006.

* cited by examiner

*Primary Examiner*—Chirag G Shah
*Assistant Examiner*—Salvador E Rivas
(74) *Attorney, Agent, or Firm*—Miller Patent Services; Jerry A. Miller (57) ABSTRACT

In an OFDM-TDMA power line communication system, time slot and carrier frequencies are assigned in a manner that reallocates time slots and carrier frequencies to enhance the efficiency of utilization of bandwidth. The reassignments are communicated between transmitting and receiving stations by transmitting tone maps that designate the reassignment of the time slots and carriers. Several variations are presented depending upon the circumstances of channel use and prior assignment of time slots and channels.

12 Claims, 11 Drawing Sheets

CARRIER

| | S0 | S1 | S2 | S3 | S4 | S5 | S6 |
|---|---|---|---|---|---|---|---|
| #7 | | | | | | | |
| #6 | ░ | | | | | | |
| #5 | ░ | | | | | | |
| #4 | ░ | | | | | | |
| #3 | | | | | | | |
| #2 | ░ | | | | | | |
| #1 | ░ | | | | | | |
| #0 | | | | | | | |

TIME SLOT

FIG. 7

CARRIER

| | S0 | S1 | S2 | S3 | S4 | S5 | S6 |
|---|---|---|---|---|---|---|---|
| #7 | | | | | | | |
| #6 | ▦ | | | | | | |
| #5 | ░ | | | | | | |
| #4 | ░ | | | | | | |
| #3 | | | | | | | |
| #2 | ░ | | | | | | |
| #1 | ░ | | | | | | |
| #0 | | | | | | | |

TIME SLOT

TIME SLOT AND CARRIER FREQUENCY ALLOCATION IN A NETWORK

CROSS REFERENCE TO RELATED DOCUMENTS

This application is related to U.S. Provisional patent application Serial No. 60/463,457 filed Apr. 16, 2003 to Iwamura, entitled "Carrier Management for a Network" which is hereby incorporated herein by reference.

FIELD OF THE INVENTION

This invention relates generally to the field of multiplex communication. More particularly, certain embodiments consistent with the present invention relate to a time/frequency slot allocation arrangement particularly suitable to power line communication (PLC) systems or other multiplexed multiple carrier communication systems.

BACKGROUND OF THE INVENTION

Power Line Communication (PLC) is becoming a popular network technology in the consumer electronics market since the existing electrical wiring of a house is used for data traffic without need for separate data wiring. PLC networks also do not have the security issues of wireless networks. Quite a few products including, but not limited to, bridges, routers and other products are currently commercially available from several manufacturers in the consumer market.

At this writing, the current PLC technology employs the technologies of OFDM (Orthogonal Frequency Division Multiplex) and CSMA/CA (Carrier Sense Multiple Access with Collision Avoidance. OFDM is a known modulation scheme that uses multiple carriers in a spread spectrum transmission scheme to transmit information. CSMA/CA is a known channel access protocol that is used in Ethernet. In such PLC systems, transmitters and receivers exchange information that identifies available/usable carriers (called a "tone map") every several seconds. Some carriers cannot be used because of noise interference (e.g., from motors, switching power regulators and other sources of electrical interference). The transmitter transmits data using the available carriers and leaves the others unused.

The operation of the CSMA/CA channel access mechanism is as follows. Before the transmitter starts a transmission, the transmitter first detects the network bus. If the bus is not busy, the transmitter starts transmission. When the bus is busy, the transmitter re-tries transmission after a random waiting time.

OVERVIEW OF CERTAIN EMBODIMENTS OF THE INVENTION

The present invention relates generally to multiplexed communication systems and methods. Objects, advantages and features of the invention will become apparent to those skilled in the art upon consideration of the following detailed description of the invention.

In one embodiment consistent with the present invention, a time slot and carrier allocation method for time division multiple access (TDMA) multiple carrier communications involves determining from a tone map that first and second time slots are generally allocated to a first and a second receiver respectively; determining that a carrier is unused during the first time slot; and transmitting a new tone map to the first and second receivers that specifies that the unused carrier is to be reallocated to the second receiver.

In another embodiment consistent with the present invention, a time slot and carrier allocation method for time division multiple access (TDMA) multiple carrier communications involves determining from a tone map that a first time slot is generally allocated to a first receiver for receipt of a single stream of data for each time slot usage; determining that a carrier is unused during the first time slot; determining that a second stream of data is to be sent to the first receiver; and transmitting a new tone map to the first receiver that specifies that the unused carrier is to be reallocated to the second stream of data.

In still another embodiment consistent with the present invention, a time slot and carrier allocation method for time division multiple access (TDMA) multiple carrier communications involves determining from a tone map that first and second time slots are generally allocated to a first and a second receiver respectively; determining from the tone map that the first and second receivers are able to receive using a common set of carriers; determining that a single data stream is to be transmitted to the first and second receivers; and transmitting a new tone map to the first and second receivers that specifies that the first and second receivers are to receive the single data stream using the common set of carriers during one or more designated time slots.

In still another embodiment, a time slot and carrier allocation method for time division multiple access (TDMA) multiple carrier communications involves determining if a time slot is available, and if so assigning a stream of data destined for a specified receiver to the time slot; if no time slot is available, determining if a time slot having the same destination is available; and if a time slot having the same destination is available, assigning a carrier in the time slot to the stream of data.

In yet another embodiment consistent with the present invention, a time slot and carrier allocation method for time division multiple access (TDMA) multiple carrier communications involves determining if a number of commonly used carriers between two or more receivers is greater than a threshold number of carriers; if so, calculating a number of time slots as a carriers divided by the number of commonly used carriers; assigning the time slots to the receivers; and assigning a stream of data to the common carriers.

Other embodiments are also possible within the scope of the present invention. The above descriptions are intended to illustrate exemplary embodiments of the invention which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The above-mentioned CSMA/CA system does not generally provide sufficient QoS (Quality of Service) for audio/video transmission. The next generation network, as currently proposed, will introduce TDMA (Time Division Multiplex Access) and time slot management to guarantee a higher QoS level. In this next generation system, a bus master divides the time axis to small time slots and assigns some of them to each communication based on its priority. Each time slot in this proposed next generation network is reserved for a single stream of data destined for a single receiver.

Unfortunately, in such a proposed system, carriers may not be used efficiently. When the transmitter communicates with a receiver, it uses only the available carriers—that is, carriers that are able to communicate with a particular receiver with a particular service quality. The other unavailable carriers are left unused. When only a small number of carriers are available, the bandwidth available in unavailable carriers is not negligible. Also, another problem can occur when the transmitter broadcasts a stream to multiple receivers. Since the availability of carriers is highly dependent upon each network path between transmitter and receiver, the transmitter sends the same data repeatedly to each receiver using different carriers. This redundant transmission is wasteful of bandwidth and is compounded when the same message is destined for many receivers.

Figure 1:
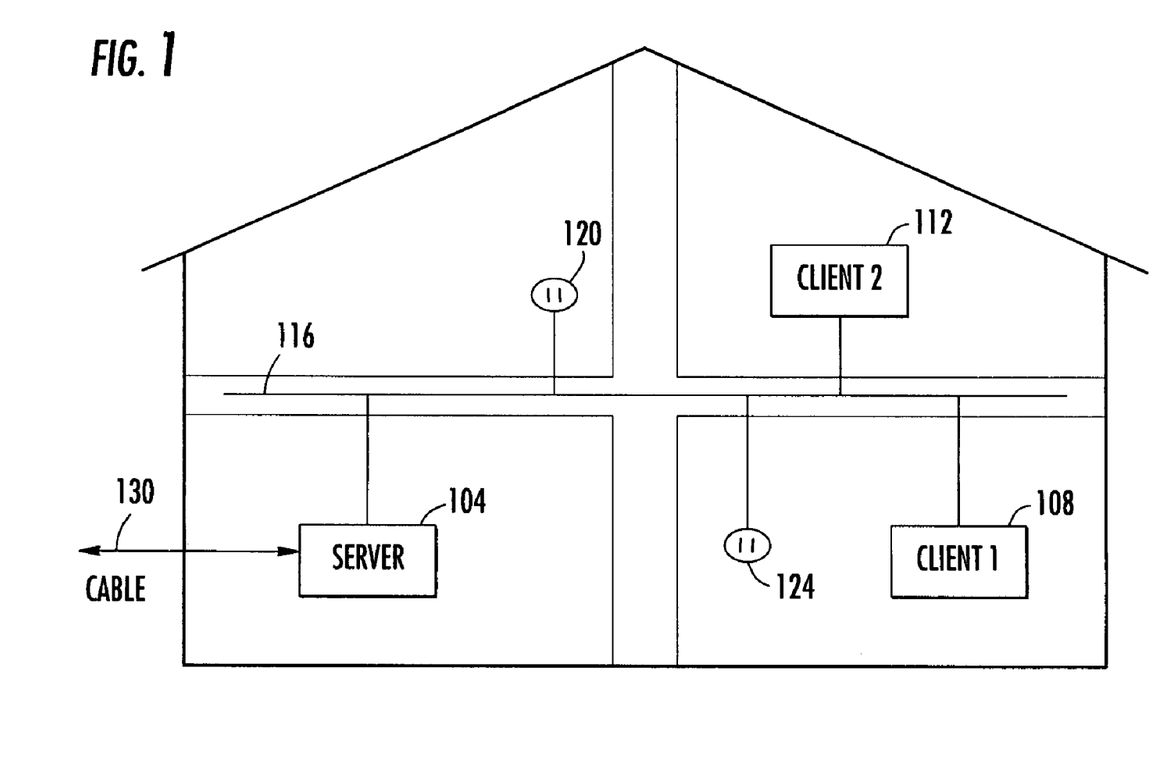
FIG. 1 is a block diagram of a power line communication network consistent with certain embodiments of the present invention.

FIG. 1 illustrates an example of a simple home PLC system. Server 104, Client (1) 108 and Client (2) 112 are connected to the home power line 116 for use as a physical data distribution medium for the current exemplary network. Power line 116 serves further serves to distribute power to electrical outlets such as 120 and 124. Server 104 stores various types of data possibly including, but not limited to, audio/video data and sends a stream data to a Client. Also, Server 104 receives an audio/video stream, e.g., from a cable television network 130 and redistributes it to the Clients. For purposes of this document, the word "stream" is used for both isochronous and asynchronous communications.

Figure 2:
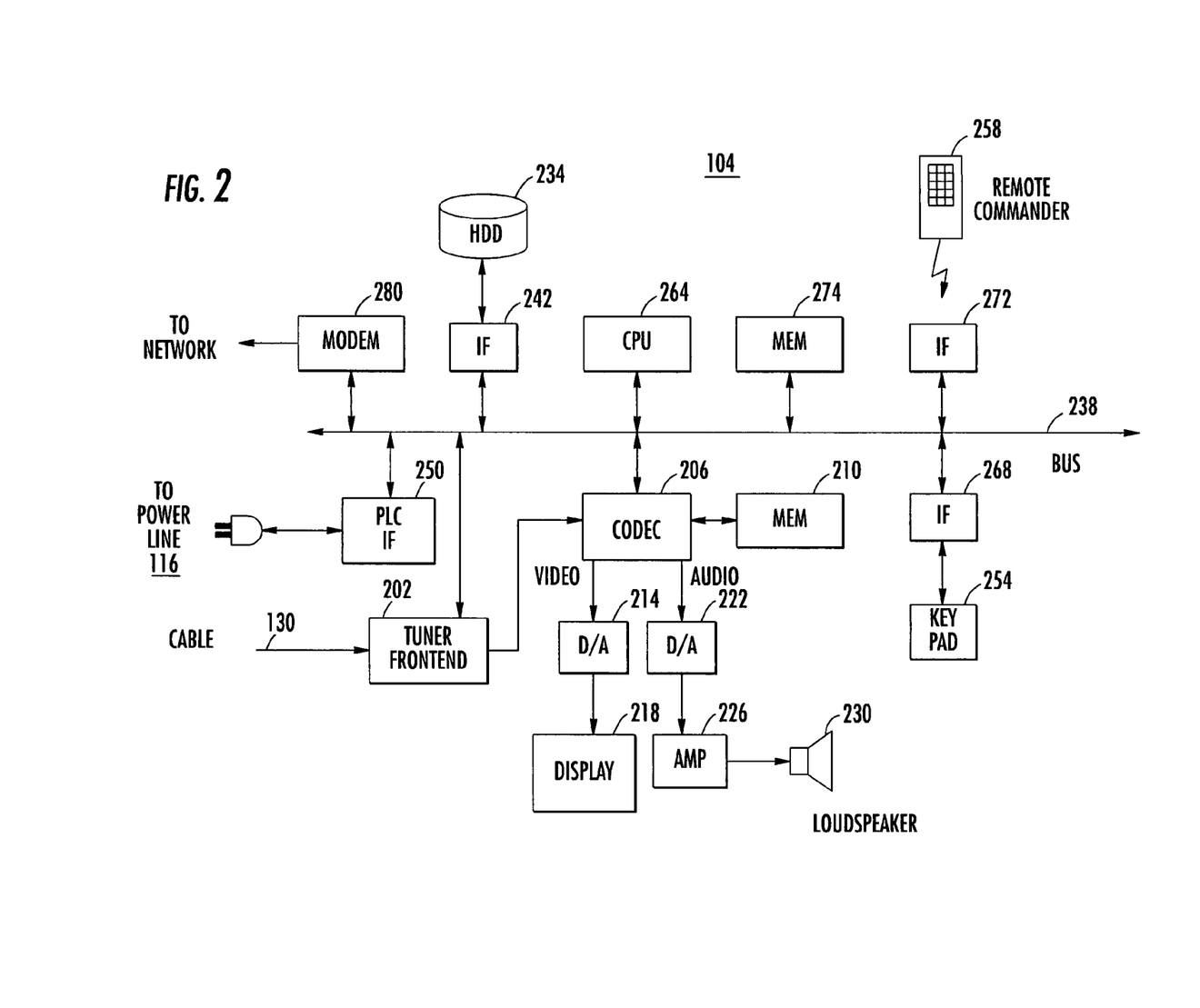
FIG. 2 is a block diagram of an exemplary Server device consistent with certain embodiments of the present invention.

An exemplary server such as Server 104 is depicted in FIG. 2 in block diagram form. Tuner Front-end 202 receives an RF signal from the cable network 130. Codec block 206 decodes the demodulated digital signal from Tuner Front-end 202 using Memory 210. The decoded video signal is then Digital to Analog converted in D/A Converter 214 for display on a Display 218 such as a monitor. A decoded audio signal is similarly Digital to Analog converted in D/A converter 222, amplified in an amplifier 226 and ultimately sent to a loudspeaker or loudspeaker system 230. To record a video stream, Codec 206 sends the video stream to HDD 234 through Bus 238 and Interface 242. To replay the recorded stream, Codec 206 receives the stream from HDD 234 via interface 242 and bus 238, decodes it and the audio and video are converted to analog at 214 and 222 and further processed as previously described.

Assume that Server 104 sends a video stream to client 108 over power line 116 (or other suitable transmission medium). The stream from tuner front-end 202 is sent to a PLC interface 250 through Codec 206. PLC interface 250 sends the stream to client 108. Similarly, to play the recorded stream in HDD 234, the stream from HDD 234 is sent to PLC interface 250 and sent to client 108 over the power line 116. PLC interface 250 may include an encrypter and a decrypter (not shown). This permits all of the communication to be encrypted before sending to the power line 116 and decrypted after receiving from the power line 116. The server can be controlled by user inputs into a Key Pad 254 or Remote Commander 258. Key Pad 254 sends commands to a central processing unit (CPU) 264 through Interface 268 and Bus 238. Similarly, Remote Commander 258 sends commands to CPU 264 through an infrared or other wireless Interface 272 and Bus 238. CPU 264 operates under program control in conjunction with its associated memory 274 to oversee operation of the server. Server 104 may also incorporate a modem 280 for communication between the server 104 and a computer network or the Internet. Modem 280 can be, for example, an ADSL modem or a cable modem.

Figure 3:
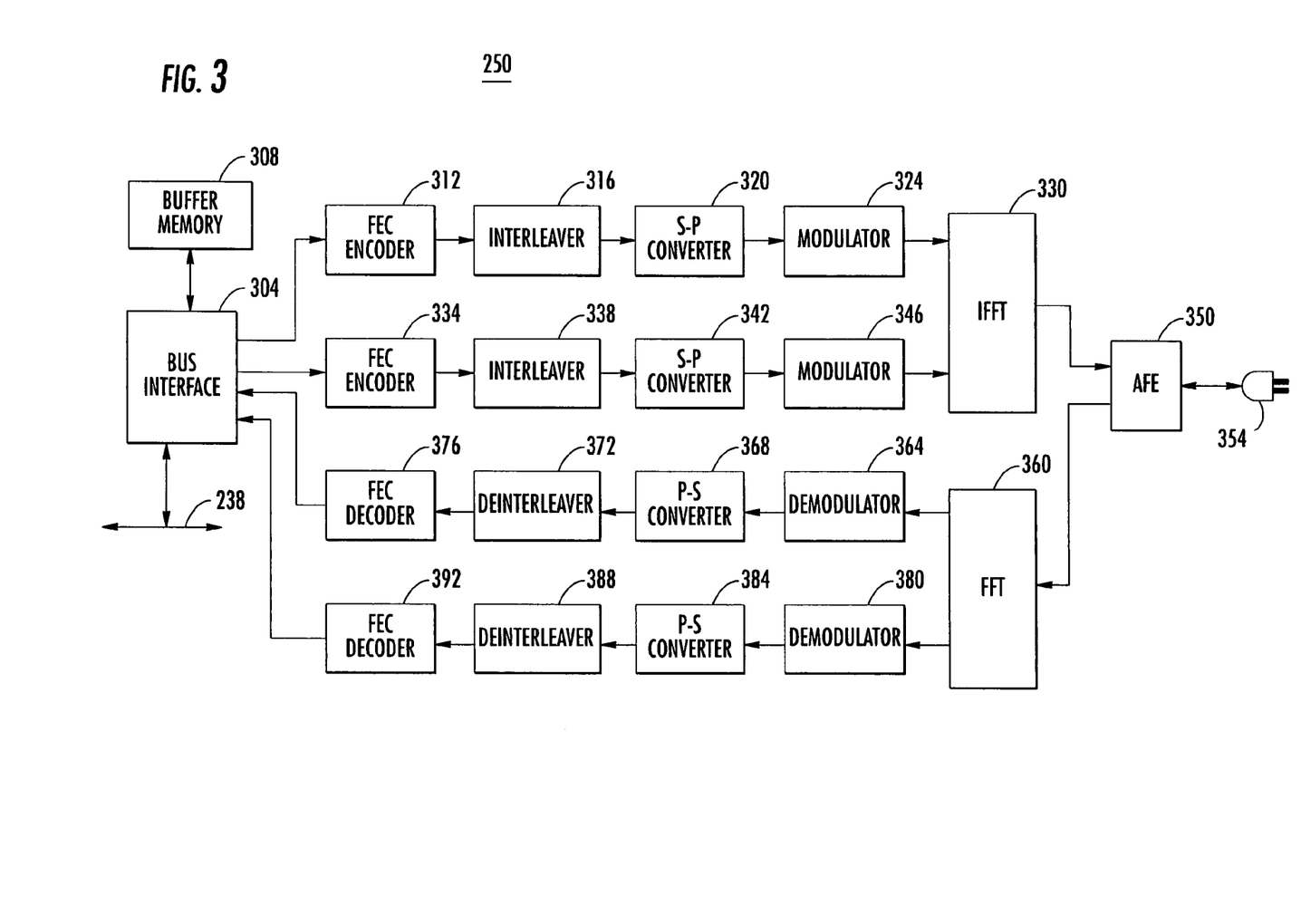
FIG. 3 is a block diagram of an exemplary power line interface consistent with certain embodiments of the present invention.

FIG. 3 illustrates an exemplary block diagram of an embodiment of PLC interface 250. In this exemplary embodiment, data to be transmitted are received from Bus 238 by Bus Interface 304 and can be stored in Buffer Memory 308 if necessary. Error correction code is added to the data in Forward Error Correction (FEC) Encoder 312. Interleaver 316 interleaves the resulting error correction encoded data. The interleaver 316 spreads out data to minimize errors in consecutive bits that might otherwise be caused by transient noise, etc., thus enhancing the ability to correct errors. A Serial-to-Parallel converter (S/P) 320 converts the interleaved data to parallel data. The parallel signals from S/P 320 are modulated by a Modulator 324 and sent to Inverse Fast Fourier Transform (IFFT) block 330.

A second path for transmitted data can also be provided through FEC 334, Interleaver 338, S/P 342 and Modulator 346 for a second stream. The components 334 through 346 of the second path function in the same manner as that of components 312 through 324. If the performance of components 312 through 324 is fast enough to process two streams within a required time, components 334 through 346 may be eliminated. In IFFT 330, a carrier is assigned to each input signal and the input signals are inverse fast-Fourier-transformed. The resulting transformed signal is sent to Analog Front End 350 that interfaces with the power line 116 through the power plug 354.

The lower blocks of FIG. 3 are used for data reception. AFE 350 receives a stream from one or more clients over the power line 116. This received data are fast-Fourier -transformed by FFT 360, demodulated by Demodulator 364 and converted to serial data by Parallel-to-Serial converter (P/S) 368. The result is de-interleaved by De-interleaver 372, error-corrected by Forward Error Correction (FEC) Decoder 376 and sent to Bus Interface 304.

In a similar manner, received data from FFT 360 for a second data stream are fast-Fourier -transformed by FFT 360, demodulated by Demodulator 380 and converted to serial data by Parallel-to-Serial converter (P/S) 384. The result is de-interleaved by De-interleaver 388, error-corrected by Forward Error Correction (FEC) decoder 392 and sent to Bus Interface 304. As with the transmission side, if components 364 through 376 are fast enough to process two streams, components 380 to 392 are not required. PLC Interface 250, thus, simultaneously transmits or receives two independent data streams using different carriers, in accordance with certain embodiments consistent with the present invention.

Figure 4:
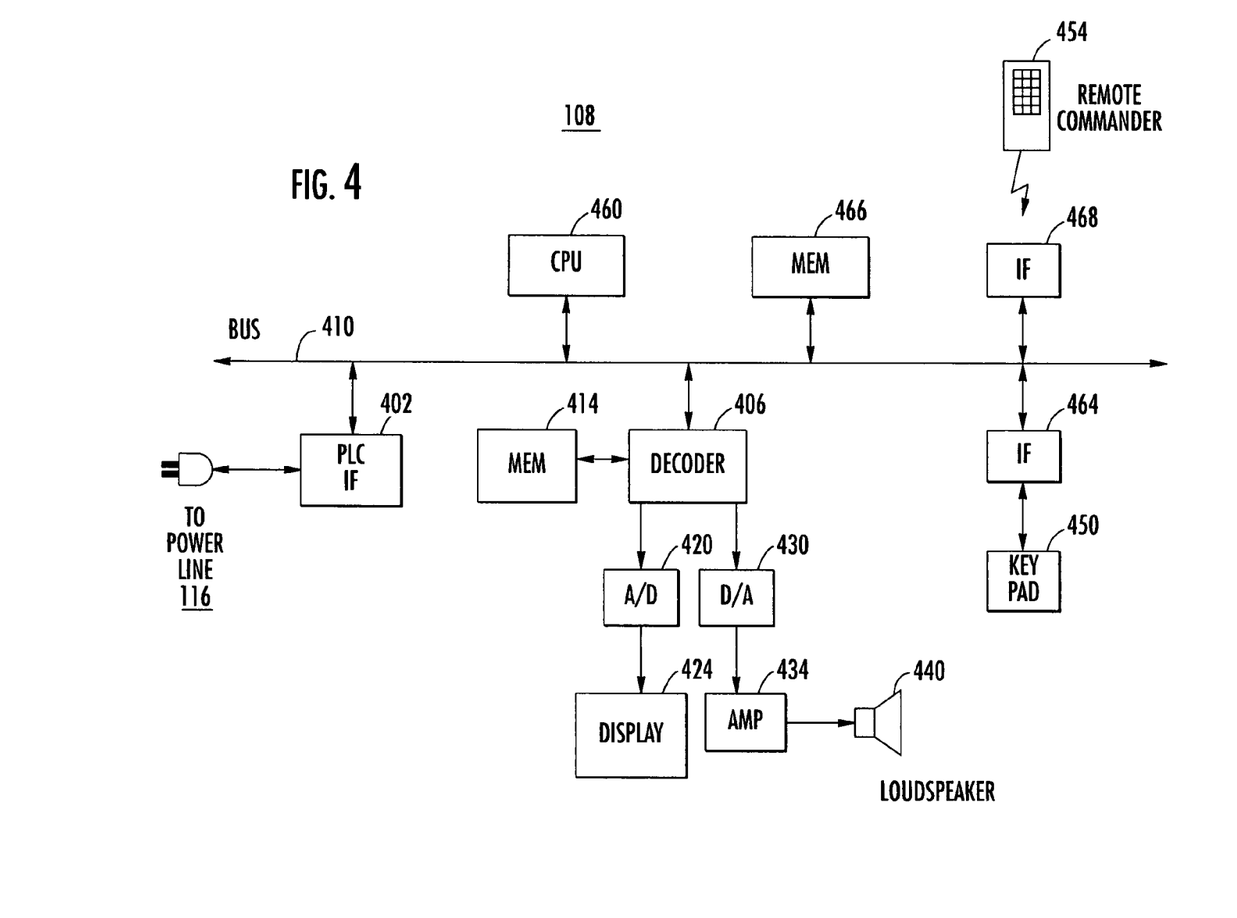
FIG. 4 is a block diagram of an exemplary Client consistent with certain embodiments of the present invention.

FIG. 4 shows an exemplary embodiment of Client 108 or Client 112 (e.g., Client 108 is shown). A Power Line Communication Interface (PLC IF) 402 receives a data stream from server 104 and sends the received data stream to Decoder 406 through bus 410. Decoder 406 decodes the stream using its associated Memory 414. The resulting decoded video signal is converted to analog using Digital to Analog converter 420 for display on a Display 424. The resulting decoded audio signal is converted to analog in D/A 430, amplified in Amplifier 434 and sent to one or more Loudspeakers 440. PLC Interface 402 may include an encrypter and a decrypter (not shown) to encrypt transmitted data and decrypt received data. In this embodiment, all of the communication is encrypted before sending to the power line and decrypted after receipt from the power line 116.

The user can input commands using keypad 450 or remote commander 454. Keypad 450 sends command to a CPU 460 through interface 464 and bus 410. CPU 460 operates under control of one or more computer programs stored in Memory 466. Similarly, remote commander 454 sends commands to CPU 460 through interface 468 and bus 410. CPU 460 controls each component connected to or through bus 410. PLC Interface 402 can have the same components illustrated in FIG. 3. If the client does not have to simultaneously send two streams, components 334 through 346 may be omitted.

In the proposed OFDM-TDMA system, "tone maps" are used to identify carriers that are used for communication between a transmitter and a receiver. The transmitter and receiver frequently exchange a tone map, for example, on a periodic basis of every 5 seconds, so that the transmitter and receiver each know what carrier frequencies to use to carry out communications. The tone map table can be renewed every time tone maps are exchanged. The transmitter sends transmission data with a tone map to the receiver. From the tone map, the receiver knows the carriers and Fourier-transforms used for the transmitted data.

Figure 5:
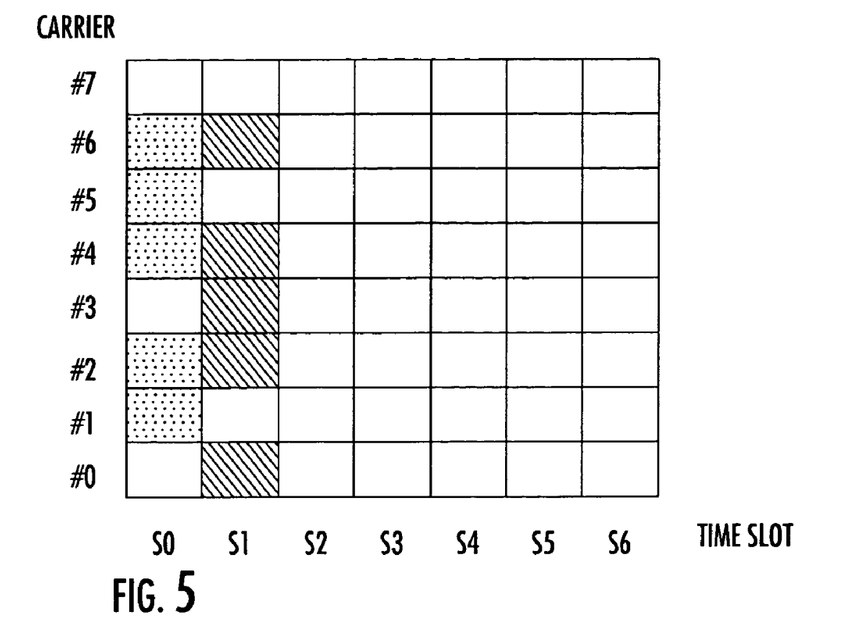
FIG. 5 is a first illustrative example tone map table.

FIG. 5 depicts an exemplary tone map shown in table form wherein time slots are shown as columns on the table. The rows indicate carriers. For simplification, this illustrative embodiment depicts only eight carriers (carriers #0 through #7) and seven time slots (time slots S0 through S6) in FIG. 5, but it will be apparent to those skilled in the art upon consideration of the present teaching that actual systems may use any number of such carriers, and it is contemplated that much larger numbers of carriers (e.g., more than 100 carriers) will generally be used. The IFFT 330 described above stores data representing this table. Based on the table, IFFT 330 assigns carriers to input signals.

Due to the nature of the power line communications medium, there are frequently carriers that exhibit high levels of interference or attenuation such that these carriers are unusable for data communication between certain transmitters and receivers. However, these carriers may be usable between the same transmitter and different receivers. Thus, when a transmitter communicates with a receiver, the transmitter transmits only over "available carriers"—that is, carriers that are able to support data communication with some degree of reliability between the transmitter and receiver. The other "unavailable carriers" in the same time slot are left unused in the proposed OFDM-TDMA system. In accordance with certain embodiments consistent with the present invention, these unavailable carriers can in fact be used and are assigned to another stream sent to another receiver.

FIG. 5 illustrates a tone map table in which the transmitter of interest sends data to two different receivers using time slots S0 and S1 respectively in a manner contemplated by a conventional interpretation of TDMA. In this example, the transmitter uses five carriers to send a data stream to the receiver. The five dotted blocks in time slot column S0 indicate the available carriers, #1, #2, #4, #5 and #6 are used for transmitting this data stream to the receiver using time slot S0). The transmitter also uses five carriers to communicate with a second receiver. The five hatched blocks (#0, #2, #3, #4 and #6) in time slot S1 depict the carriers used for communication with the second receiver. When the network is not busy and there are adequate available slots, the transmitter may use a slot for each stream. However, when the network is busy, the transmitter manages time slot assignment so that time-critical data such as isochronous data streams are given high priority.

Figure 6:
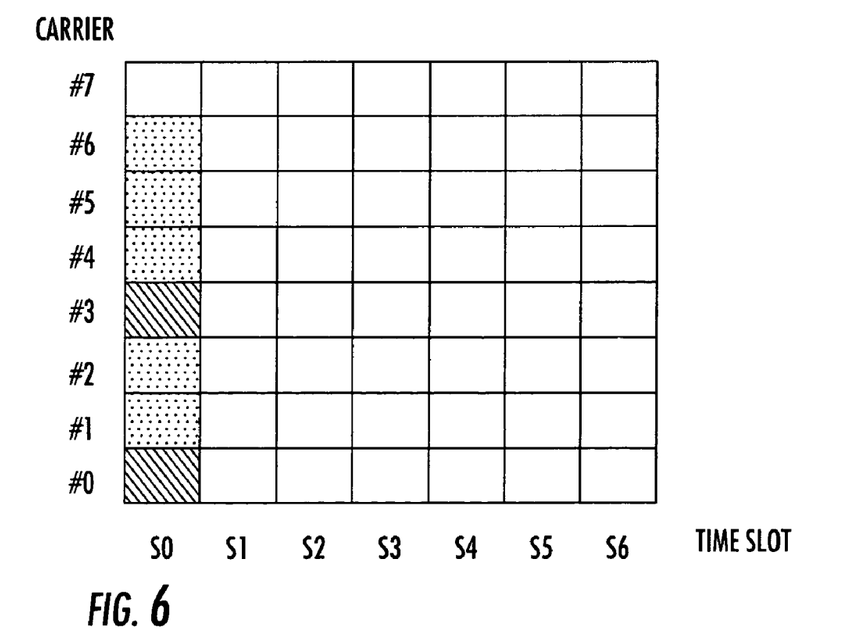
FIG. 6 is a second illustrative example tone map table.

In accordance with an embodiment consistent with the present invention, unused carriers are assigned to non-time-critical, asynchronous data streams and a time slot is saved for a time-critical data stream. This is illustrated in FIG. 6. If the stream in time slot S1 is not time-critical, carrier #0 and #3 in time slot S0 can be used to carry data destined for another receiver than that normally assigned to slot S0. Thus, time slot S0 carries two streams destined for two receivers. A data frame is associated with S0 and has two destinations, the first receiver and the second receiver. Also the data frame contains carrier information that specifies which destination receiver uses which of the carriers. As a result of this, carriers #0 and #3 can be used to send information destined for the second receiver during the time slot S0. Therefore, two carriers are used for the second stream destined for the second receiver during time slot S0. This frees up two slots from time slot S1 to thereby increase the bandwidth thereof and increase the actual throughput of data during the time slot S0. The empty time slots in S1 are then available to be similarly utilized to enhance the throughput of the system.

Figure 7:
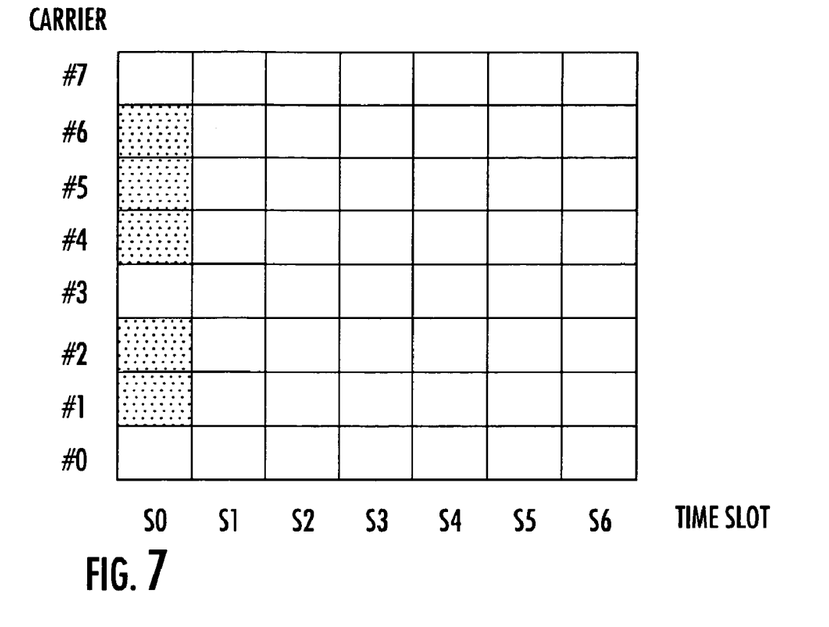
FIG. 7 is a third illustrative example tone map table.
Figure 8:
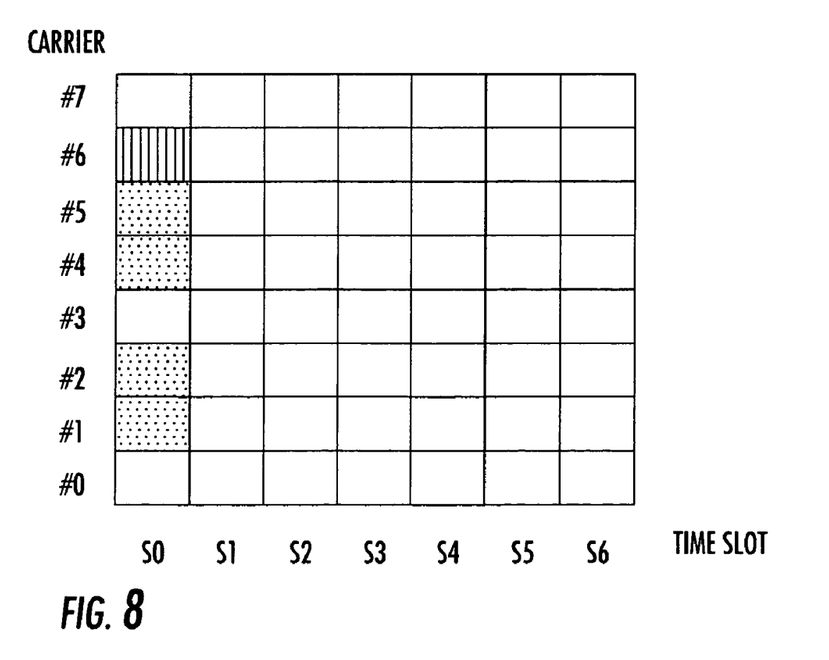
FIG. 8 is a fourth illustrative example tone map table.

When independent data streams from the transmitter share the same destination, they may share a time slot, in accordance with certain embodiments consistent with the present invention. In one example, the transmitter may send an audio/video stream and control commands to the same receiver. Control commands are sent as an asynchronous stream, whereas the audio/video stream may be isochronous. When the network is not congested, the transmitter may send the two streams using two different time slots. However, when the network is congested, the two slots can be merged into one slot. This is depicted in the example of FIG. 7 and FIG. 8.

The five dotted blocks (carriers #1, #2, #4, #5 and #6) in time slot S0 indicate available carriers for communication between the transmitter and the receiver. In accordance with certain embodiments consistent with the present invention, one of the carriers, e.g., carrier #6, is assigned to the asynchronous stream during time slot S0. The block having the vertical hatching marks indicates this time slot and carrier combination. Carriers #1, #2, #4 and #5 are used for the first stream. Usually, control command communication (i.e., a control stream) is short and not time-critical, therefore it is wasteful of bandwidth to assign a whole time slot for such a short command. Although the bandwidth for the first, isochronous stream in time slot S0 may be narrower, the time slot assigned for the second stream is now available for the first stream. As a result, carriers and time slots can be used more efficiently, in accordance with certain embodiments.

It may be desirable to limit the bandwidth available for carrying the second stream by limiting the bandwidth to no more than, for example, 10% of all available carriers, but other limits may be suitable depending upon the exact implementation. The data frame of S0 has only one destination. As discussed previously, the data frame associated with time slot S0 can be used to carry information that determines which stream uses which carrier(s) during the time slot.

Figure 9A:
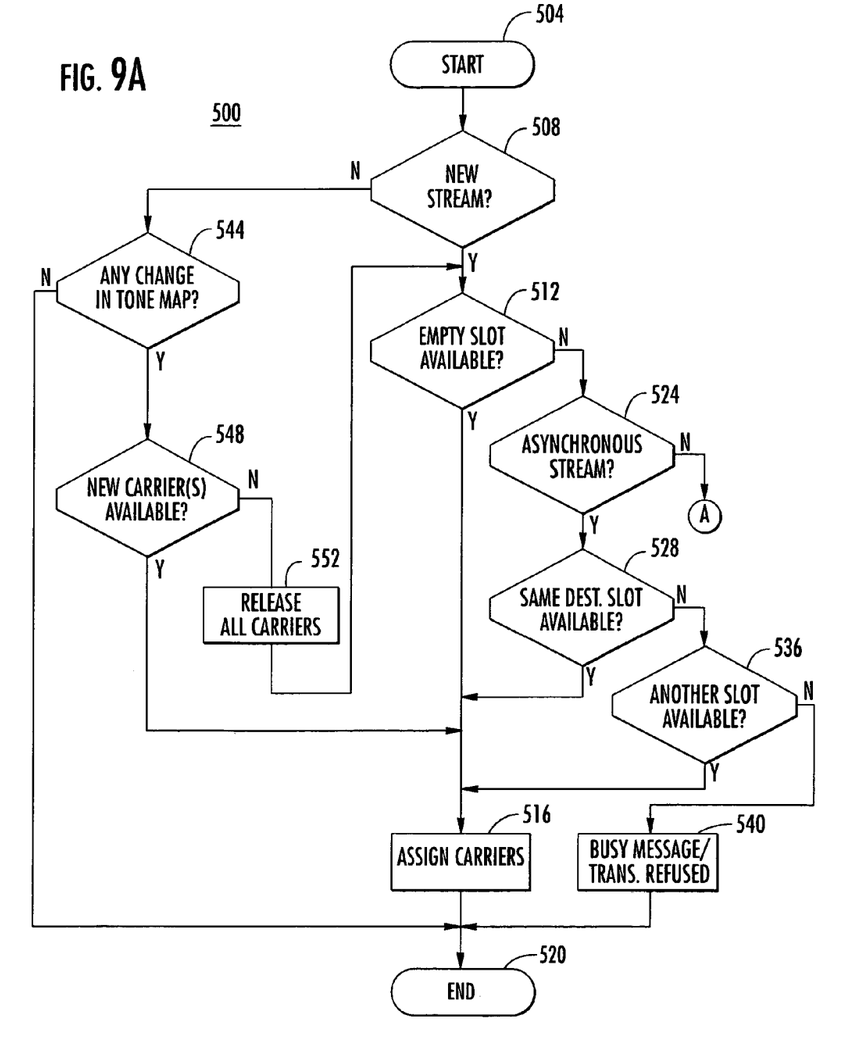
FIG. 9, which is made up of FIG. 9A and FIG. 9B, is a flow chart of a carrier assignment algorithm consistent with certain embodiments of the present invention.
Figure 9B:
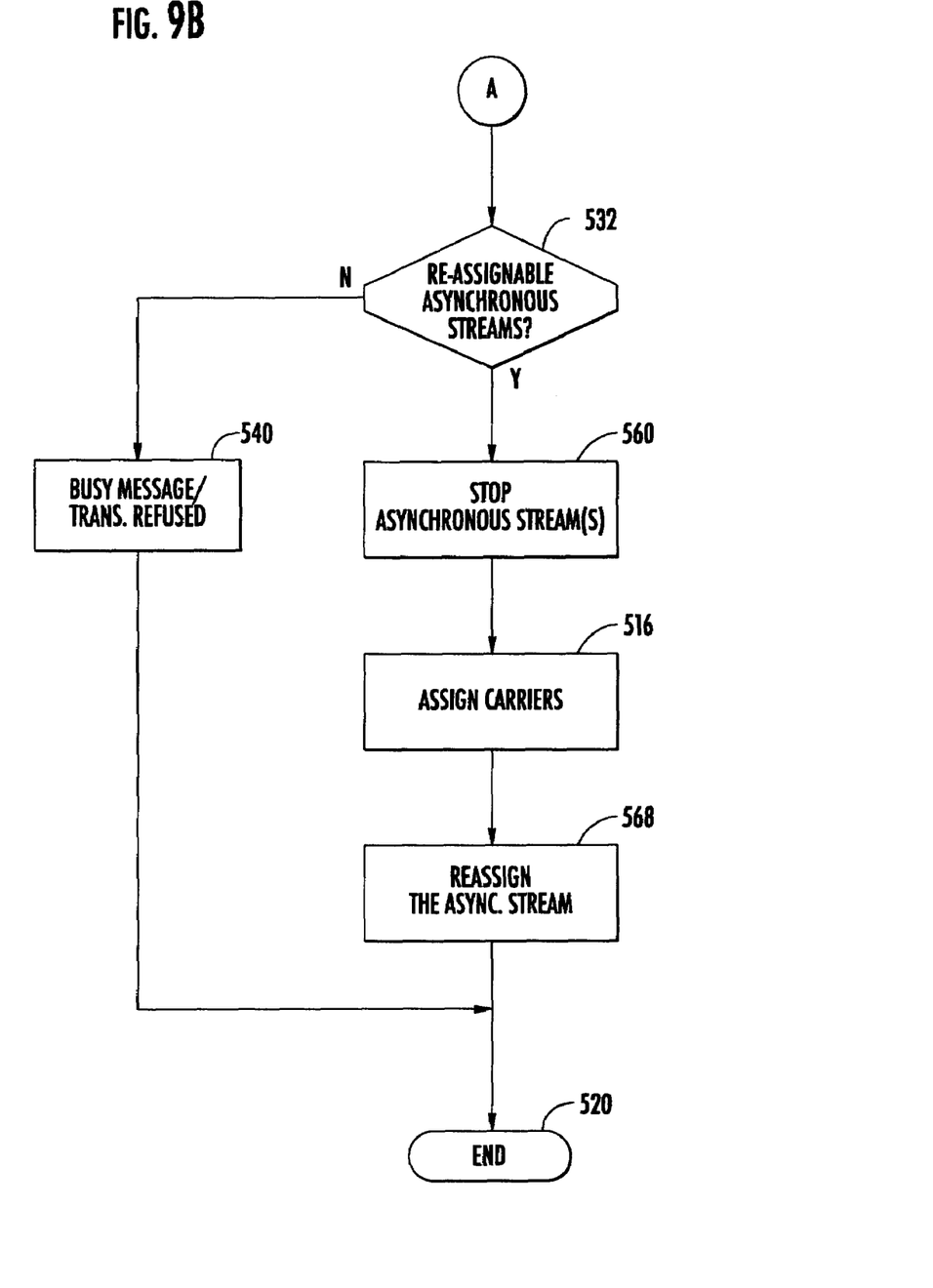

In view of the above discussion of the assignment of carriers, a time slot assignment algorithm consistent with certain embodiments of the present invention is depicted in FIG. 9, which is made up of FIG. 9A and FIG. 9B. The previous discussion generally described how carriers are assigned. This flow chart 500 describes an algorithm that assigns a time slot for each stream. The algorithm is applied at 504 to each stream every time tone maps are exchanged, for example, every 5 seconds. Also, the algorithm can preferably be performed when a new stream starts or an existing stream terminates. If the stream is a new stream at 508, the process goes to 512. If an empty slot is available at 512, the slot is assigned for the stream at 516 and the process ends at 520. If no empty slot is available at 512, the process proceeds to 524. If the stream is asynchronous at 524, the process goes to 528. If the stream is synchronous, the process goes to 532. At 528, if there is a slot that has the same destination (receiver), the slot is assigned to the new stream at 516. At 516, some of available carriers in the time slot are assigned for the new stream. If "no" at 528, the process seeks another available slot at 536. If another slot is found, it is assigned to the new stream at 516. If no available slot exists at 536, the transmitter may provide a busy message, for example that is displayed on the display 218 at 540 and the transmission is refused.

At 508, if the stream is not a new one, its tone map is checked at 544. If there is no change in the tone map, no action is needed and the process ends at 520. If there are change(s) in the tone map at 544, the process checks to see whether the new carriers in the tone map are available at 548. (Note that some carriers might be already used by another stream.) If available, all carriers are assigned at 516 and the process ends at 520. If new carriers are not available at 548, all the carriers assigned for this stream are released at 552 and the stream is processed as a new stream starting at 512 as described above.

If the stream is isochronous at 524, control passes to 532 (of FIG. 9B). An asynchronous stream, which has lower priority than an isochronous stream will be stopped and instead the isochronous stream will get the time slot(s). Time slots assigned only for an asynchronous stream are checked at 532. If such a slot is found, the transmitter stops the asynchronous stream at 560. Then, the slot is re-assigned for the synchronous stream at 516. At 568, another slot is re-assigned for the asynchronous stream by calling the current algorithm recursively. At 532, if no slot is available, the transmitter may indicate a busy message on the display 218 and refuses the isochronous transmission at 540 and the process ends at 520.

A transmitter may often broadcast the same stream to multiple receivers. For example, the transmitter may send background music data and each receiver receives and decodes it. Because signal conditions for each network path is not the same, available carriers are not necessarily common in the receivers. In the proposed OFDM-TDMA scheme, the transmitter sends the same data repeatedly to each receiver based on the tone map. That is, the same message may occupy multiple carriers spanning multiple time slots to transmit the same message repeatedly. This redundancy is not negligible when there are many receivers, especially, when the network is busy. Such situation can result in a serious network congestion. In accordance with certain embodiments consistent with the present invention, commonly available carriers are used to create a broadcast mechanism. When there are few or no commonly available carriers, two time slots can be merged into one to cut the number of time slots in half.

Figure 10:
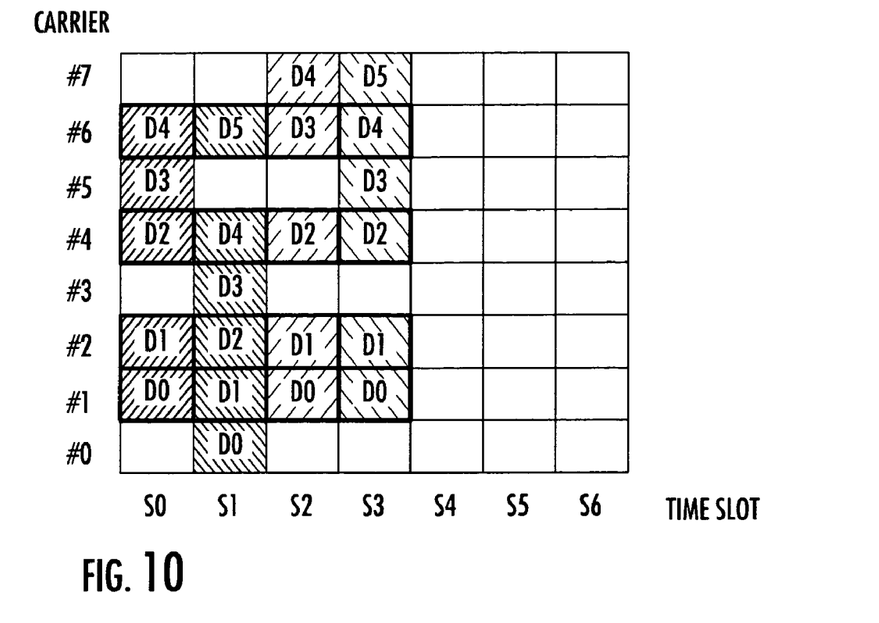
FIG. 10 is a fifth illustrative example tone map table.

FIG. 10 shows an example tone map table for broadcast by the proposed OFDM-TDMA system. In this example, the transmitter sends a stream to four receivers. Time slot S0 is for the first receiver and carriers #1, #2, #4, #5 and #6 are available. Data D0 through D4 are assigned to each carrier. The next time slot S1 is for the second receiver. Carrier #0, #1, #2, #3, #4 and #6 are used to send Data D0 through D5. Similarly, S2 and S3 are used for the third and the fourth receiver, respectively. In accordance with this scheme, each data block is sent four times—once to each receiver creating a situation in which bandwidth is wasted by redundant transmissions.

Figure 11:
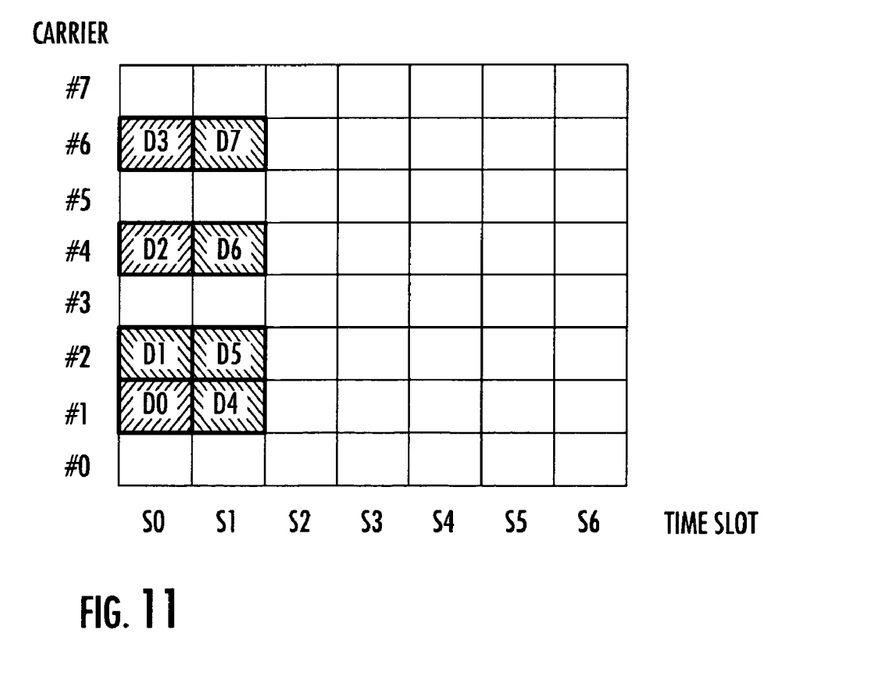
FIG. 11 is a sixth illustrative example tone map table.

FIG. 11 shows an example of a broadcast tone map table used by certain embodiments consistent with the present invention. In this embodiment, the system detects that there are commonly available carriers for all four of the target receivers (See FIG. 10). The carriers #1, #2, #4 and #6 are commonly available carriers for all four receivers and are depicted as surrounded by bold lines. In accordance with this embodiment, these four carries and two slots are used to send data D0 to D7. The multiple recipients are called out in the frame structure used to send slots S0 and S1. This arrangement saves two time slots over the arrangement shown in FIG. 10. Moreover, the system of FIG. 10 is at best able to send D0 to D5 (i.e. six segments of data) using four time slots, while the system depicted by FIG. 10 can send D0 to D7 (eight segments of data) to all four receivers using only two time slots.

Figure 12:
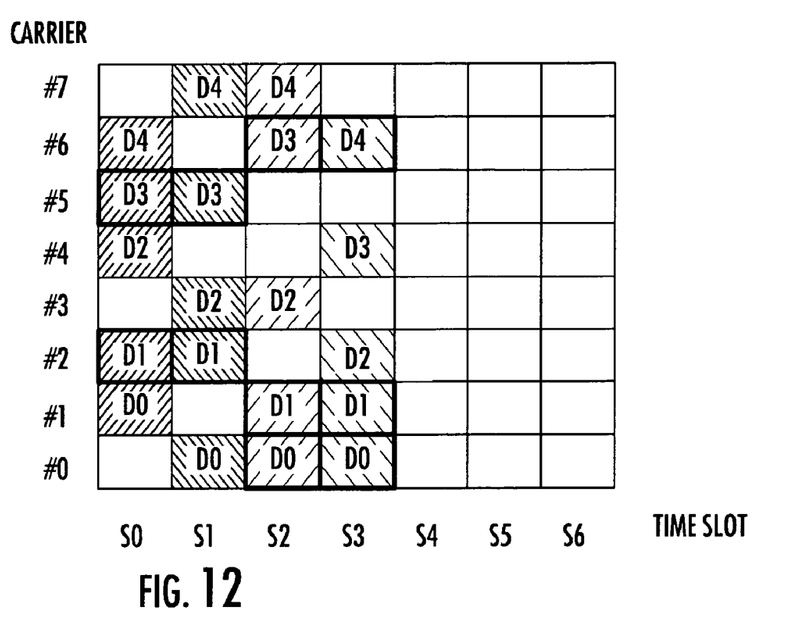
FIG. 12 is a seventh illustrative example tone map table.
Figure 13:
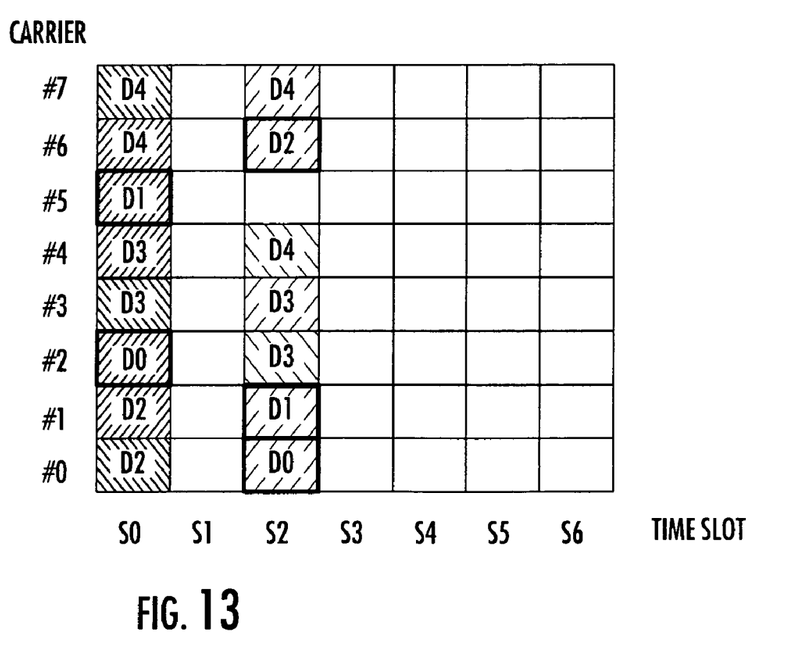
FIG. 13 is a eighth illustrative example tone map table.

When few carriers are commonly available, this approach does not provide the above benefits. This is especially the case, if the number of common carriers is less than a half of the maximum available number of carriers. For example, if the maximum number of carriers is six in S1 and S3 and the number of common available carriers is less than 3, 3 or more slots are used and no benefit is obtained. In this case, two slots can be merged into one. FIG. 12 shows an example of a worst-case scenario. In this example, the four receivers are shown to share no common carriers. Carriers #2 and #5 (enclosed by bold lines) are commonly available between slots S0 and S1. FIG. 13 shows a merged result. Carriers #2 and #5 carry Data D0 and D1 to both receivers (the receivers associated with slots S0 and S1). Carrier #0 is assigned to send D2 to the second receiver. The first receiver cannot receive carrier #0. Carrier #1 sends D2 to the first receiver. Carrier #3 and #4 sends D3 to each receiver, respectively. Similarly, carrier #5 and #6 sends D4. The data frame of S0 is configured to have two destinations. The data frame also contains carrier information that the receiver uses to determine which carriers contain data destined for it. In the same way, S2 and S3 in FIG. 12 are merged into S2 shown in FIG. 13. S1 and S3 in FIG. 13 can be used for other communications or S1 can be used instead of S2.

Figure 14:
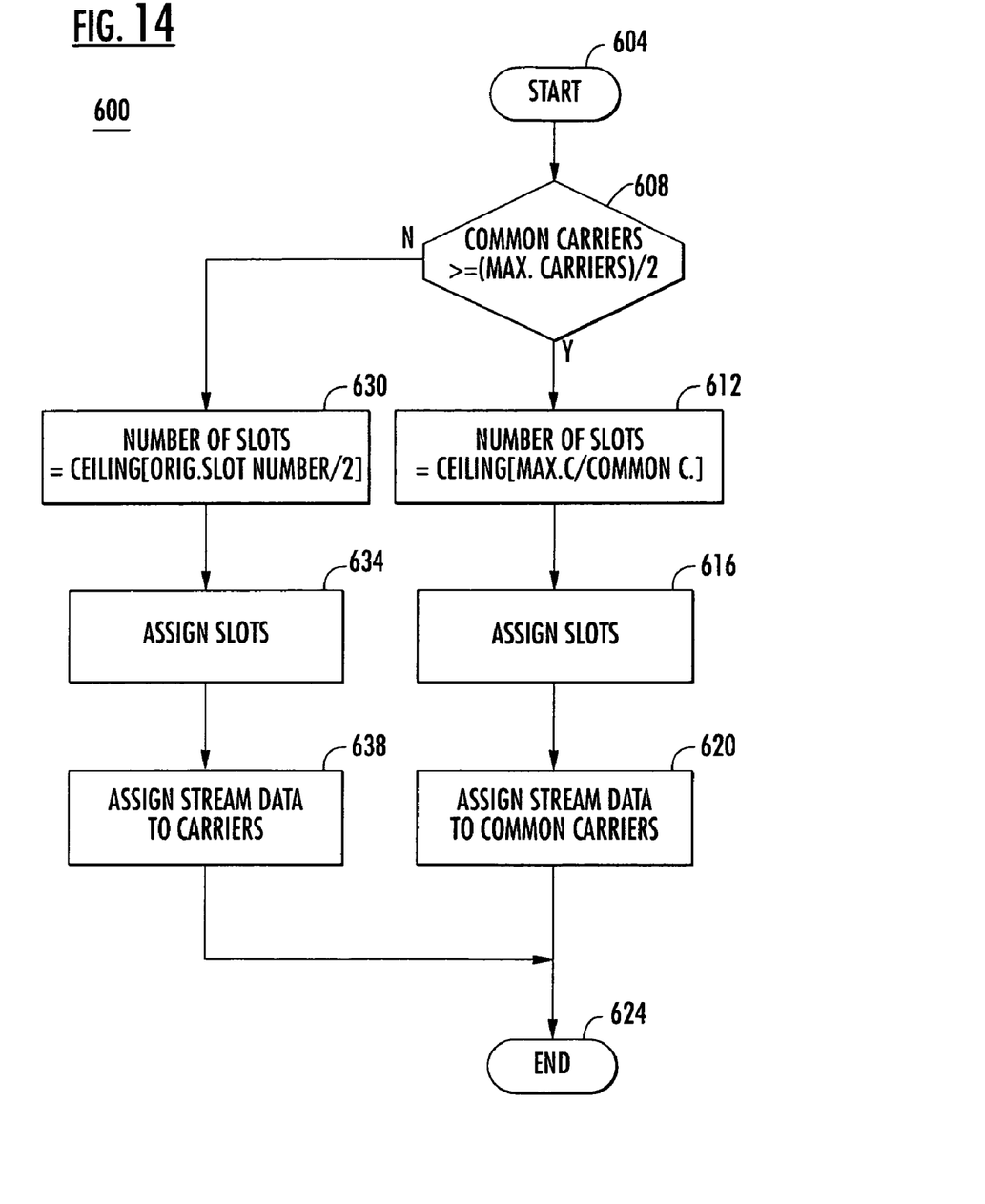
FIG. 14 shows an illustrative time slot assignment algorithm for broadcast communications.

FIG. 14 shows a time slot assignment algorithm 600 for broadcast communications starting at 604. The number of common carriers is checked at 608 and if the number is equal to or larger than a half of the maximum number of carriers (or equal to or larger than some other threshold number of carriers), control passes to 612. At 612, a new slot number is calculated such that the maximum number of carriers is divided by the number of common carriers. The result is rounded up to the closest integer. For example, in case of FIG. 10, the result of division is 6/4=1.5, which is rounded up to 2. At 616, actual time slots are assigned. The stream of data is divided among the available common carriers at and assigned accordingly at 620 in the same manner as was described previously. The process ends at 624.

AT 608, if the result is less than a half of the maximum number of carriers (or other threshold number of carriers), control passes to 630. A number of slots is determined by calculating half (or other fraction) of the original number of slots, and this number of slots is assigned. If the value is not an integer, it will be rounded up to the closest integer. In the example of FIG. 12, the result of the division is 4/2=2; Thus, the number of slots is two. Pairs of the time slots are merged into a single slot at 634. The stream of data is divided to each of the carriers at 638 and the process again ends at 624.

This algorithm can be applied to each stream every time tone maps are exchanged, for example, every five seconds. Also, the algorithm can be performed when a new stream starts or an existing stream terminates.

Those skilled in the art will appreciate that many variations of embodiments of the present invention are possible without departing from the invention. For example, in one variation, three or more streams can share a single time slot. Embodiments of this invention can also be applied not only to power line networks, but also to wireless, phone line, cable or any other networks. Embodiments consistent with this invention can also be applied to FDMA (Frequency Division Multiplex Access). In an FDMA system, carriers and time slots change places. Time slots on the same carrier are assigned to two or more streams.

Thus, in accordance with certain embodiments consistent with the present invention, when the network is busy, two or more independent streams are assigned to one time slot based on time criticalness of each stream. Time slots and carriers can be efficiently and dynamically allocated. Also, using common carriers, in certain embodiments consistent with the invention, can reduce redundancy of multiple broadcast transmissions. In the case of few common carriers, two or more time slots can be merged into one to reduce the number of total time slots needed. With small additions of hardware and software, transmission efficiency will be improved in certain embodiments.

Those skilled in the art will recognize that the present invention has been described in terms of exemplary embodiments that are based upon use of a programmed processor such as CPU 264 and CPU 460 with program code stored in HDD 234 or memory 274 and memory 466. However, the invention should not be so limited, since the present invention could be implemented using hardware component equivalents such as special purpose hardware and/or dedicated processors, which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will also appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies Without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A time slot and carrier allocation method for time division multiple access (TDMA) multiple carrier communications, comprising:
    determining from a tone map that first and second time slots are generally allocated to a first and a second receiver respectively;
    determining from the tone map that the first and second receivers are able to receive using a common set of carriers;
    determining that a single data stream is to be transmitted to the first and second receivers;
    transmitting a new tone map to the first and second receivers that specifies that the first and second receivers are to receive the single data stream using the common set of carriers during one or more designated time slots;
    wherein the number of common carriers is greater than a threshold number of available carriers, and wherein the threshold number comprises approximately 50% of available carriers; and
    wherein a number of unused carriers allocated to the control stream of data is less than a specified maximum, and the specified maximum comprises approximately 10% of available carriers.

2. The time slot and carrier allocation method according to claim 1, further comprising transmitting a control stream of data to the first and second receivers using the common carrier.

3. The time slot and carrier allocation method according to claim 1, wherein the single stream of data comprises audio/video data.

4. The time slot and carrier allocation method according to claim 1, wherein the communication comprises an Orthogonal Frequency Division Multiplexed TDMA communication.

5. The time slot and carrier allocation method according to claim 1, wherein the new tone map specifies that an unused carrier is to be reallocated to a plurality of other streams of data.

6. The time slot and carrier allocation method according to claim 1, further comprising transmitting the single data steam using the common set of carriers during the designated time slots.

7. The time slot and carrier allocation method according to claim 1, wherein the tone map designates that the first and second receivers receive the single data stream using merged time slots.

8. An electronic storage medium storing instructions which, when executed on a programmed processor, carry out a time slot and carrier allocation method according to claim 1.

9. The method according to claim 1, wherein the communication is carried out in a power line communication system.

10. A time slot and carrier allocation method for time division multiple access (TDMA) multiple carrier communications, comprising:
    determining from a tone map that first and second time slots are generally allocated to a first and a second receiver respectively;
    determining from the tone map that the first and second receivers are able to receive using a common set of carriers;
    determining that a single data stream is to be transmitted to the first and second receivers;
    transmitting a new tone map to the first and second receivers that specifies that the first and second receivers are to receive the single data stream using the common set of carriers during one or more designated time slots, wherein the new tone map specifics that an unused carrier is to be reallocated to a plurality of other streams of data;
    transmitting the single data stream using the common set of carriers during the designated time slots;
    transmitting a control stream of data to the first and second receivers using the common carrier; and
    wherein the number of common carriers is greater than a threshold number of available carriers, and wherein the threshold number comprises approximately 50% of available carriers, and wherein the tone map designates that the first and second receivers receive the single data stream using merged time slots, and wherein the single stream of data comprises audio/video data; and
    wherein a number of unused carriers allocated to the control stream of data is less than a specified maximum, and wherein the specified maximum comprises approximately 10% of available carriers, and wherein the communication comprises an Orthogonal Frequency Division Multiplexed TDMA power line communication.

11. The method according to claim 10, wherein the communication is carried out in a power line communication system.

12. An electronic storage medium storing instructions which, when executed on a programmed processor, carry out a time slot and carrier allocation method according to claim 10.

* * * * *

UNITED STATES PATENT AND TRADEMARK OFFICE
CERTIFICATE OF CORRECTION

PATENT NO.         : 7,423,992 B2
APPLICATION NO.    : 10/616344
DATED              : September 9, 2008
INVENTOR(S)        : Iwamura It is certified that error appears in the above-identified patent and that said Letters Patent is hereby corrected as shown below:

In col. 9, line 45, after "of", delete -- 30 --.

In col. 10, line 4, delete "Without" and insert -- without -- therefor.

Signed and Sealed this

Eleventh Day of November, 2008

JON W. DUDAS
*Director of the United States Patent and Trademark Office*